United States Patent
Cochell et al.

(10) Patent No.: US 11,055,106 B1
(45) Date of Patent: Jul. 6, 2021

(54) BOOTSTRAPPING A PROGRAMMABLE INTEGRATED CIRCUIT BASED NETWORK INTERFACE CARD

(71) Applicant: Xilinx, Inc., San Jose, CA (US)

(72) Inventors: Ellery Cochell, Sunnyvale, CA (US); Brian S. Martin, Longmont, CO (US); Chandrasekhar S. Thyamagondlu, Sunnyvale, CA (US); Ravi N. Kurlagunda, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/719,449

(22) Filed: Dec. 18, 2019

(51) Int. Cl.
G06F 9/4401 (2018.01)
G06F 21/57 (2013.01)
G06F 13/28 (2006.01)

(52) U.S. Cl.
CPC ............ G06F 9/4406 (2013.01); G06F 13/28 (2013.01); G06F 21/575 (2013.01); G06F 2221/034 (2013.01)

(58) Field of Classification Search
CPC ...... G06F 9/4406; G06F 9/4401; G06F 13/28; G06F 21/575; G06F 2221/034
See application file for complete search history.

(56) References Cited

U.S. PATENT DOCUMENTS

| | | | |
|---|---|---|---|
| 6,091,263 A | 7/2000 | New et al. | |
| 6,150,839 A | 11/2000 | New et al. | |
| 6,204,687 B1 | 3/2001 | Schultz et al. | |
| 6,462,579 B1 | 10/2002 | Camilleri et al. | |
| 6,507,211 B1 | 1/2003 | Schultz et al. | |
| 6,525,562 B1 | 2/2003 | Schultz et al. | |
| 6,526,557 B1 | 2/2003 | Young et al. | |
| 6,573,748 B1 | 6/2003 | Trimberger | |
| 6,625,794 B1 | 9/2003 | Trimberger | |
| 6,759,869 B1 | 7/2004 | Young et al. | |
| 6,810,514 B1 | 10/2004 | Alfke et al. | |
| 6,836,842 B1 | 12/2004 | Guccione et al. | |
| 6,907,595 B2 | 6/2005 | Curd et al. | |

(Continued)

OTHER PUBLICATIONS

Abel, F., et al., "An FPGA Platform for Hyperscalers," In 2017 IEEE 25th Annual Symposium on High-Performance Interconnects (HOTI) Aug. 28, 2017 (pp. 29-32). IEEE.

(Continued)

*Primary Examiner* — Glenn A. Auve
(74) *Attorney, Agent, or Firm* — Kevin T. Cuenot

(57) ABSTRACT

Bootstrapping a programmable integrated circuit (IC) based network interface card (NIC) can include implementing, within the programmable IC, a first circuitry by loading a first stage configuration bitstream, wherein the first circuitry includes a bus endpoint configured to communicate with a host computer via a communication bus, a platform processor, and a first bootloader. The platform processor, executing the first bootloader, loads a first firmware within the programmable IC. A second circuitry is implemented within the programmable IC by the platform processor executing the first firmware to load a second stage configuration bitstream. The second circuitry includes a NIC controller. The platform processor, executing the first firmware, loads a second firmware within the programmable IC. The second firmware is executable to configure the second circuitry.

20 Claims, 10 Drawing Sheets

(56) References Cited

U.S. PATENT DOCUMENTS

| | | |
|---|---|---|
| 7,024,651 B1 | 4/2006 | Camilleri et al. |
| 7,057,413 B1 | 6/2006 | Young et al. |
| 7,109,750 B2 | 9/2006 | Vadi et al. |
| 7,124,338 B1 | 10/2006 | Mark et al. |
| 7,138,820 B2 | 11/2006 | Goetting et al. |
| 7,218,137 B2 | 5/2007 | Vadi et al. |
| 7,224,184 B1 | 5/2007 | Levi et al. |
| 7,233,532 B2 | 6/2007 | Vadi et al. |
| 7,235,999 B2 | 6/2007 | Goetting et al. |
| 7,302,625 B1 | 11/2007 | Payakapan et al. |
| 7,477,072 B1 | 1/2009 | Kao et al. |
| 7,478,357 B1 | 1/2009 | Mason et al. |
| 7,482,836 B2 | 1/2009 | Levi et al. |
| 7,509,617 B1 | 3/2009 | Young |
| 7,518,396 B1 | 4/2009 | Kondapalli et al. |
| 7,546,572 B1 | 6/2009 | Ballagh et al. |
| 7,599,299 B2 | 10/2009 | Goetting et al. |
| 7,619,442 B1 | 11/2009 | Mason et al. |
| 7,640,527 B1 | 12/2009 | Dorairaj et al. |
| 7,673,271 B1 * | 3/2010 | Becker .......... G06F 30/367 716/101 |
| 7,724,815 B1 | 5/2010 | Raha et al. |
| 7,746,099 B1 | 6/2010 | Chan et al. |
| 8,102,188 B1 | 1/2012 | Chan et al. |
| 8,359,448 B1 | 1/2013 | Neuendorffer |
| 8,415,974 B1 | 4/2013 | Lysaght |
| 8,719,750 B1 | 5/2014 | Balzli, Jr. |
| 8,928,351 B1 | 1/2015 | Konduru |
| 9,722,613 B1 | 8/2017 | Schultz et al. |
| 9,977,758 B1 * | 5/2018 | Schumacher .......... G06F 30/34 |
| 10,031,760 B1 * | 7/2018 | Santan ............ G06F 9/44505 |
| 2017/0123815 A1 * | 5/2017 | Sarmah ............ G06F 9/4408 |
| 2019/0087606 A1 * | 3/2019 | Subhaschandra ....... G06F 21/31 |
| 2019/0324806 A1 * | 10/2019 | Javre ................. G06F 9/50 |

OTHER PUBLICATIONS

Anderson, B., Detecting Encrypted Malware Traffic (Without Decryption), [online] Cisco Blog/Security, Jun. 23, 2017, retrieved from the Internet: <https://blogs.cisco.com/security/detecting-encrypted-malware-traffic-without-decryption>, 9. pg.

Chiou, D., "The Microsoft catapult project," In 2017 IEEE International Symposium on Workload Characterization (IISWC) Oct. 1, 2017 (pp. 124-124). IEEE.

Firestone, D. et al., "Azure Accelerated Networking: SmartNICs in the Public Cloud," In15th {USENIX} Symposium on Networked Systems Design and Implementation ({NSDI} 18), 2018, pp. 51-66.

Liguori, A., "The Nitro Project: Next-Generation EC2 Infrastructure," AWS Tech Talks (webinar, talk with slides), Feb. 5, 2018. YouTube video.

Mellanox Technologies, "Mellanox Innova—2 Flex Open Programmable SmartNIC," 2018, Product Brochure MLNX54019PG, Rev. 1.4, 3 pg.

Microsoft, Inc., "Microsoft unveils Project Brainwave for real-time AI—Microsoft Research," [olnline] Microsoft © 2019, retrieved from the Internet: <https://www.microsoft.com/en-us/research/blog/microsoft-unveils-project-brainwave/>, 8 pg.

SolarFlare Communications, Inc., "SFA7942Q Dual-Port 40GbE QSFP+Halfl-Lenth ApplicationOnload Engine," 2015, Product Brochure SF-114649-CD Issue 3, 2 pg.

Xilinx Inc., White Paper WP499, Breathe New Life into Your Data Center with Alveo Adaptable Accelerator Cards, San Jose, CA USA.

Xilinx Inc.,White Paper WP505, Versal: The First Adaptive Compute Acceleration Platform (ACAP), San Jose, CA USA.

Xilinx, Inc.,"SDAccel Environment User Guide," UG1023 (v2018.3), Jan. 24, 2019, 165 pg, San Jose, CA USA.

* cited by examiner

400

Implement, within a programmable integrated circuit (IC), a first circuitry by loading a first stage configuration bitstream, wherein the first circuitry includes a bus endpoint configured to communicate with a host computer via a communication bus, a platform processor, and a first bootloader
402

Load within the programmable IC, by the platform processor executing the first bootloader, platform processor (e.g., first) firmware
404

Implement a second circuitry within the programmable IC by the platform processor, executing the first firmware, loading a second stage configuration bitstream, wherein the second circuitry includes a network interface card (NIC) controller
406

Load within the programmable IC, by the platform processor executing the platform processor firmware, NIC processor (e.g., second) firmware executable to configure the second circuitry
408

NIC processor, in executing second firmware, requests platform processor load network extension(s) bitstream to implement network extension circuit(s) in network extension RP
410

NIC processor, in executing second firmware, configures network extension circuit(s) implemented in network extension RP
412

BOOTSTRAPPING A PROGRAMMABLE INTEGRATED CIRCUIT BASED NETWORK INTERFACE CARD

TECHNICAL FIELD

This disclosure relates to integrated circuits (ICs) and, more particularly, to bootstrapping a programmable IC based network interface card.

BACKGROUND

Network attached acceleration refers to processing that is typically performed on a network interface card (NIC) that is coupled to a host computer (e.g., a server) as a peripheral device. The NIC typically receives data through network ports and performs basic packet processing functions.

Bootstrapping or "boot" refers to the process of starting a device and putting the device into a state of readiness for operation. In the case of a NIC, the NIC must be operable prior to the operating system within the host computer being operable. This means that the NIC may not obtain configuration data for bootstrapping from the host computer to which the NIC is coupled as a peripheral device.

The NIC may be bootstrapped by loading a single, monolithic set of configuration data from a flash memory. This approach, however, may run afoul of boot time requirements for peripheral devices for certain communication buses. Further, anytime the NIC is updated, the network must be brought down and the connection between the host computer and the NIC severed. This is unacceptable within many computing environments such as datacenters that provide uptime guarantees.

SUMMARY

In one aspect, a method can include implementing, within a programmable integrated circuit (IC), a first circuitry by loading a first stage configuration bitstream. The first circuitry includes a bus endpoint configured to communicate with a host computer via a communication bus, a platform processor, and a first bootloader. The platform processor, executing the first bootloader, loads a first firmware within the programmable IC. The method can include implementing second circuitry within the programmable IC by the platform processor, executing the first firmware, loading a second stage configuration bitstream. The second circuitry includes a network interface card (NIC) controller. The platform processor, executing the first firmware, loads a second firmware within the programmable IC. The second firmware is executable to configure the second circuitry.

In another aspect, a programmable IC can include a first circuitry implemented by loading a first stage configuration bitstream. The first circuitry includes a bus endpoint configured to communicate with a host computer via a communication bus, a platform processor, and a first bootloader. The platform processor, in executing the first bootloader, loads, a first firmware. The programmable IC further can include a second circuitry implemented by loading a second stage configuration bitstream subsequent to the first stage configuration bitstream, wherein the second circuitry includes a NIC controller. The platform processor, in executing the first firmware, loads the second stage configuration bitstream and subsequently loads a second firmware that is executable to configure the second circuitry.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 illustrates an example method of bootstrapping a programmable IC based network interface card (NIC).

DETAILED DESCRIPTION

Figure 1:
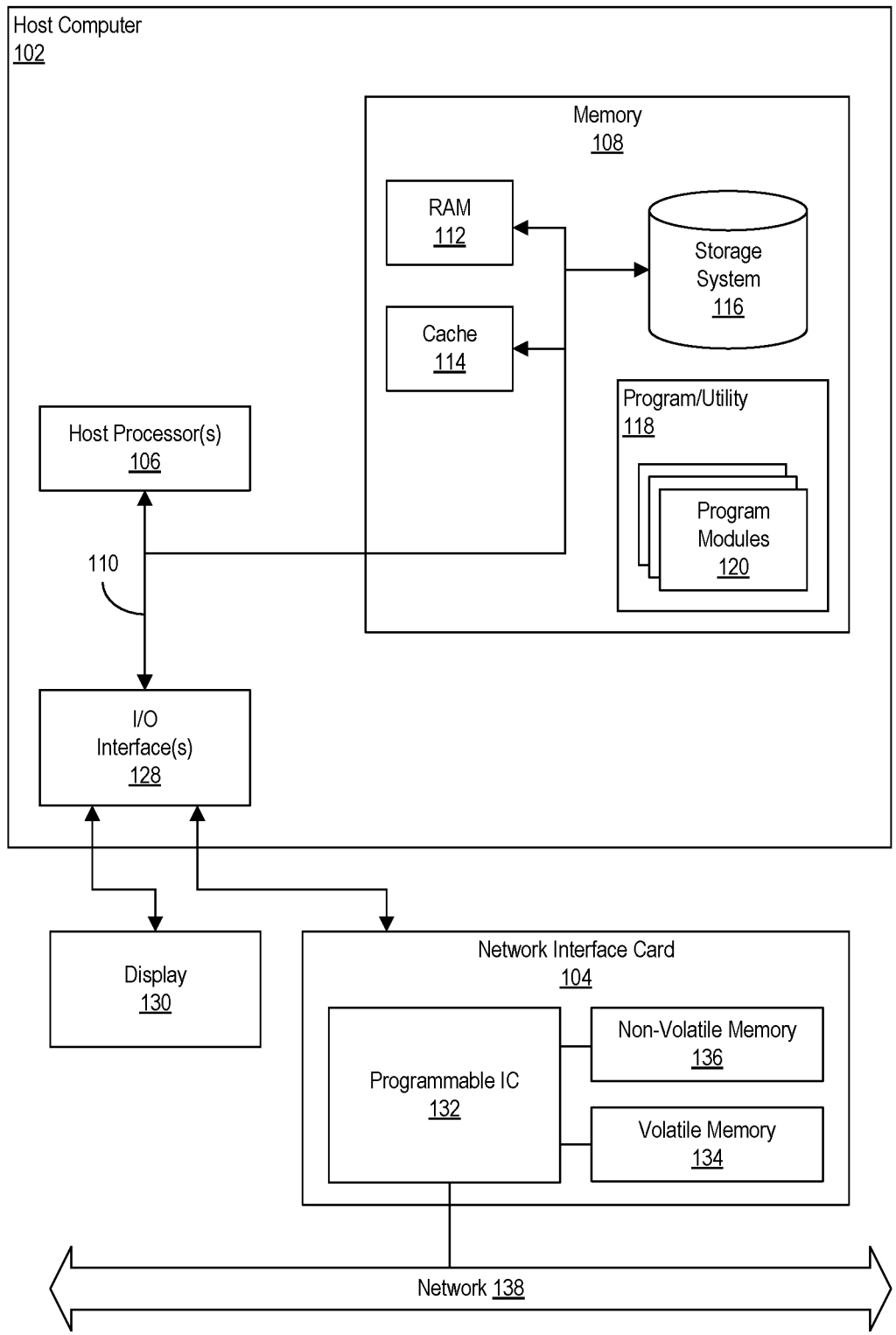
FIG. 1 illustrates an example computing environment for use with the inventive arrangements described within this disclosure.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to bootstrapping a programmable IC based network interface card (NIC). Within many datacenters, programmable ICs are used for purposes of hardware acceleration. The programmable IC is used to implement circuitry that performs tasks offloaded from a host computer. The tasks would otherwise be performed by the processor of the host computer by executing suitable program code. The circuitry implementing the task(s) within the programmable IC typically provides one or more benefits that are not attainable through execution of compiled program code using the processor of the host computer. These benefit(s) may include faster operation, reduced power consumption, redundancy, etc. Despite the fact that performing tasks in circuitry that would otherwise be performed by a processor executing program code provides benefits that may or may not include faster operation, the process of offloading tasks from a processor that executes program code to hardware is referred to as "hardware acceleration."

In many cases, the programmable IC is coupled to the host computer through a communication bus. An example of a communication bus is a Peripheral Component Interconnect Express (PCIe) bus. A PCIe peripheral device must be available or discoverable on the PCIe bus by the host computer within 100 ms from startup. This requirement extends to any type of PCIe peripheral device whether implemented as, or including, an application specific IC (ASIC) and/or a programmable IC.

In some cases, the host computer configures the programmable IC at runtime. Relying on the host computer for bootstrapping the programmable IC, however, is not a possibility in the case of a programmable IC based NIC. In such cases, the programmable IC must be bootstrapped in less time than is required for the host computer to begin executing the host operating system. As such, the NIC is unable to obtain configuration data from the host computer.

In other cases, the programmable IC is bootstrapped using a single, large configuration bitstream. Loading a single, monolithic configuration bitstream into the programmable IC is also problematic since modern programmable ICs are often loaded with multiple partial configuration bitstreams and/or multiple different pieces of firmware. Anytime that one partial configuration bitstream and/or one piece of firmware is to be updated, one would need to bring down the programmable IC to do so. This means that the network supported by the NIC may go down and the connection to the host computer may be severed. This is not acceptable in many computing environments. Moreover, loading a single, monolithic configuration bitstream into the programmable IC often takes more than the minimum required boot time imposed by the PCIe standard.

In accordance with the inventive arrangements described within this disclosure, methods and systems for bootstrapping a programmable IC based NIC are disclosed. The inventive arrangements support bootstrapping a programmable IC that implements a NIC or a portion of a NIC. The NIC may be programmable, e.g., "smart." The techniques described herein are capable of meeting the requirements of using programmable ICs within datacenters and/or as peripheral devices of host computers. For example, the inventive arrangements allow a programmable IC to meet the 100 ms requirement of a PCIe peripheral device. In addition, the bootstrapping described supports tandem boot, partial reconfiguration, and multiple processors that may be embedded in programmable logic of the programmable IC.

In one aspect, a modified tandem boot process is used to load different portions of a configuration bitstream. In general, tandem boot refers to the case where a circuit design (e.g., a configuration bitstream) is split into two configuration bitstreams (e.g., first and second stage configuration bitstreams). The first stage configuration bitstream is loaded to implement first circuitry configured to communicate with the host computer. This first circuitry may include a bus endpoint. Further, the first circuitry may include a platform processor. The first stage configuration bitstream may also include a bootloader that is executable by the platform processor.

The components of the first circuitry begin to operate after the first stage configuration bitstream is loaded into the programmable IC. For example, the bus endpoint is capable of establishing a communication link with the host computer or other system and do so in an amount of time that meets bus requirements.

Firmware that may be executed by the platform processor may be omitted from the first stage configuration bitstream. The platform processor executes the bootloader to load the firmware for the platform processor. The platform processor may then execute the firmware which causes the platform processor to load a second stage configuration bitstream. The second stage configuration bitstream specifies other portions of the original circuit design, e.g., second circuitry. The second stage configuration bitstream may be loaded after the first stage configuration bitstream and while the bus endpoint is operational.

In one aspect, the second circuitry includes a NIC controller having a NIC processor. The second stage configuration bitstream may also include a bootloader for the NIC processor. In general, the second stage configuration bitstream may be larger than the first stage configuration bitstream since the time constraints relating to implementation of certain components in the first stage configuration bitstream, e.g., the bus endpoint, are not applicable to circuitry implemented by the second stage configuration bitstream. More time is available to implement the remaining portions of the original circuit design corresponding to the second stage configuration bitstream.

In one aspect, the NIC processor executes a bootloader contained in the second stage configuration bitstream, which causes the NIC processor to issue a request to the platform processor to load firmware that is executable by the NIC processor. In response to the request, the platform processor retrieves the firmware for the NIC processor. The NIC processor is capable of executing the retrieved firmware and, in executing the firmware, configures one or more aspects of the second circuitry.

In another aspect, the NIC controller is implemented without a NIC processor. In that case, the platform processor may be enhanced through firmware to perform functions and/or operations otherwise attributable to the NIC processor.

The inventive arrangements described herein are capable of bootstrapping the programmable IC while meeting various objectives. For example, the programmable IC is capable of establishing the PCIe link with the host computer in no more than 100 ms from startup. This may be accomplished, at least in part, by minimizing the size of the first stage configuration bitstream and omitting the firmware from the first stage configuration bitstream. In addition, the programmable IC is capable of implementing the NIC controller to ensure that the network supported by the NIC is operational without relying on the host computer for bootstrapping. By implementing the NIC, including other aspects of the second circuitry as described herein, network processing performed by the programmable IC may be reconfigured to update the design over time in the field.

Further, by omitting the firmware for each of the platform processor and the NIC processor from the first and second stage configuration bitstreams, respectively, the need to reboot the NIC including the programmable IC is minimized or reduced. For example, one may update the firmware for the platform processor and/or the NIC processor without having to generate new versions of the first and/or second stage configuration bitstreams as the case may be. Generating updated versions of configuration bitstreams may be time consuming. Loading an updated version of the first stage configuration bitstream into the programmable IC would require that the NIC be taken offline on the communication bus connecting the programmable IC to the host computer. Loading an updated version of the second stage configuration bitstream may require that the NIC controller be taken offline to do so. Firmware for either the platform processor or the NIC processor may be updated without loading a new and/or different configuration bitstream into the programmable IC.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing environment 100 for use with the inventive arrangements described within this disclosure. The computing environment includes a host computer 102 coupled to a NIC 104. Computing environment 100 is representative of a datacenter. An actual datacenter may include more host computers than shown wherein one or more or all of the host computers has one or more of NIC 104 as shown. NIC 104 is capable of receiving data from network 138 through network ports and perform basic packet processing functions.

A datacenter refers to a dedicated space such as a room or building that houses computing resources. Examples of computing resources include, but are not limited to, servers, routers, switches, firewalls, telecommunications equipment, and/or storage systems. The datacenter often includes supporting components like backup equipment, fire suppression facilities, and air conditioning. A datacenter may be private or shared. Typically, the datacenter restricts access to the computing hardware to only authorized personnel.

The components of host computer 102 may include, but are not limited to, one or more host processors 106 (e.g., central processing units), a memory 108, and a bus 110 that couples various system components including memory 108 to host processor(s) 106. Host processor(s) 106 may include any of a variety of processors that are capable of executing program code. Example processor types include, but are not limited to, processors having an x86 type of architecture (Intel Architecture 32-bit, Intel Architecture 64-bit, etc.), Power Architecture, ARM processors, and the like.

Bus 110 represents one or more of any of several types of communication buses. Examples of communication buses include, but are not limited to, Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Host computer 102 typically includes a variety of computer readable media. Such media may be any available media that is accessible by host computer 102 and may include any combination of volatile media, non-volatile media, removable media, and/or non-removable media.

Memory 108 may include computer readable media in the form of volatile memory, such as random-access memory (RAM) 112 and/or cache memory 114. Host computer 102 may also include other removable/non-removable, volatile/non-volatile computer system storage media. By way of example, storage system 116 may be provided for reading from and writing to a non-removable, non-volatile magnetic and/or solid state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces. Memory 108 is an example of at least one computer program product having a set (e.g., at least one) of program modules (e.g., program code) configured to carry out the functions and/or operations described within this disclosure.

For example, program/utility 118 includes a set (at least one) of program modules 120. Program modules 120, being stored in memory 108, may include, but are not limited to, an operating system, one or more application programs (e.g., user applications), other program modules, and/or program data. Program modules 120 generally carry out the functions and/or methodologies as described herein at least with respect to operations performed by host computer 102. For example, program modules 120 may include user applications and/or a software stack. The software stack may implement a runtime environment capable of performing the host computer 102 operations described herein with regard to NIC 104. In one aspect, program modules 120 includes a driver or daemon capable of communicating with programmable IC 132.

Program/utility 118 is executable by host processor(s) 106. Program/utility 118 and any data items used, generated, and/or operated upon by host processor(s) 106 are functional data structures that impart functionality when employed by host processor(s) 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Host computer 102 may include one or more Input/Output (I/O) interfaces 128 communicatively linked to bus 110. I/O interface(s) 128 allow host computer 102 to communicate with external devices, couple to external devices that allow user(s) to interact with host computer 102, couple to external devices that allow host computer 102 to communicate with other computing devices, and the like. For example, host computer 102 may be communicatively linked to a display 130 and to NIC 104 through I/O interface(s) 128. Host computer 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, the I/O interface 128 through which host computer 102 communicates with NIC 104 is a PCIe adapter. NIC 104 may be implemented as a circuit board that couples to host computer 102. NIC 104 may, for example, be inserted into a card slot, e.g., an available bus and/or PCIe slot, of host computer 102.

NIC 104 includes a programmable IC 132. NIC 104 also includes volatile memory 134 coupled to programmable IC 132 and a non-volatile memory 136 also coupled to programmable IC 132. Volatile memory 134 may be implemented as a RAM that is external to programmable IC 132. Volatile memory 134 is considered a "local memory" of programmable IC 132, whereas memory 108, being within host computer 102, is not considered local to programmable IC 132. Non-volatile memory 136 may be implemented as flash memory. Non-volatile memory 136 is also external to programmable IC 132 and may be considered local to programmable IC 132.

Programmable IC 132 includes programmable circuitry (e.g., programmable logic). It should be appreciated that, while not explicitly shown, programmable IC 132 may include one or more hardwired circuit blocks that may be used in cooperation with the programmable circuitry. Examples of such circuit blocks may include, but are not limited to, a decryption engine and an internal configuration engine (ICE). The decryption engine is capable of automatically decrypting configuration bitstreams loaded into programmable IC 132. The ICE is the built in or default circuitry of programmable IC 132 capable of accessing non-volatile memory 136 to load an initial configuration bitstream at startup (e.g., power on or reset) of programmable IC 132. For example, the ICE may access a predetermined location in non-volatile memory 136 where an initial configuration bitstream is stored or access a location in non-volatile memory 136 having a pointer to the location where the initial configuration bitstream is stored. Both the decryption engine and the ICE may be operable without first loading a configuration bitstream.

In the example of FIG. 1, programmable IC 132 is connected to a network 138. In one example, network 138 is an Ethernet type of network. Network 138 may operate at any of a variety of different speeds. For example, network 138 may be a 10G, 25G, 50G, 100G, 200G, 400G, or other speed network. In particular implementations, network 138 may be, include, or couple to a 5G network. Programmable IC 132 includes an Ethernet interface (not shown) that is used to connect to, e.g., communicatively link, programmable IC 132 to network 138. For example, programmable IC 132 may be connected via network 138 to an Ethernet switch or one or more other network connected devices. For purposes of illustration, the term "network" refers to network 138 herein, e.g., an Ethernet network.

FIG. 1 is not intended to suggest any limitation as to the scope of use or functionality of the examples described herein. Host computer 102 is an example of computer hardware (e.g., a system) that is capable of performing the various operations described within this disclosure relating to NIC 104 and/or programmable IC 132.

Host computer 102 is only one example implementation of a computer that may be used with NIC 104. Host computer 102 is shown in the form of a computing device, e.g., a computer or server. Host computer 102 can be practiced within a datacenter. For example, host computer 102 may be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments, edge computing environments, and/or datacenters, generally support the FPGA-as-a-Service (FaaS) model. In the FaaS model, user functions and/or network functions are hardware accelerated as circuit designs implemented within programmable ICs operating under control of the host computer. Other examples of cloud computing models are described in the National Institute of Standards and Technology (NIST) and, more particularly, the Information Technology Laboratory of NIST.

Host computer 102 is operational with numerous other general-purpose or special-purpose computing system environments or configurations. Examples of computing systems, environments, and/or configurations that may be suitable for use with host computer 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2:
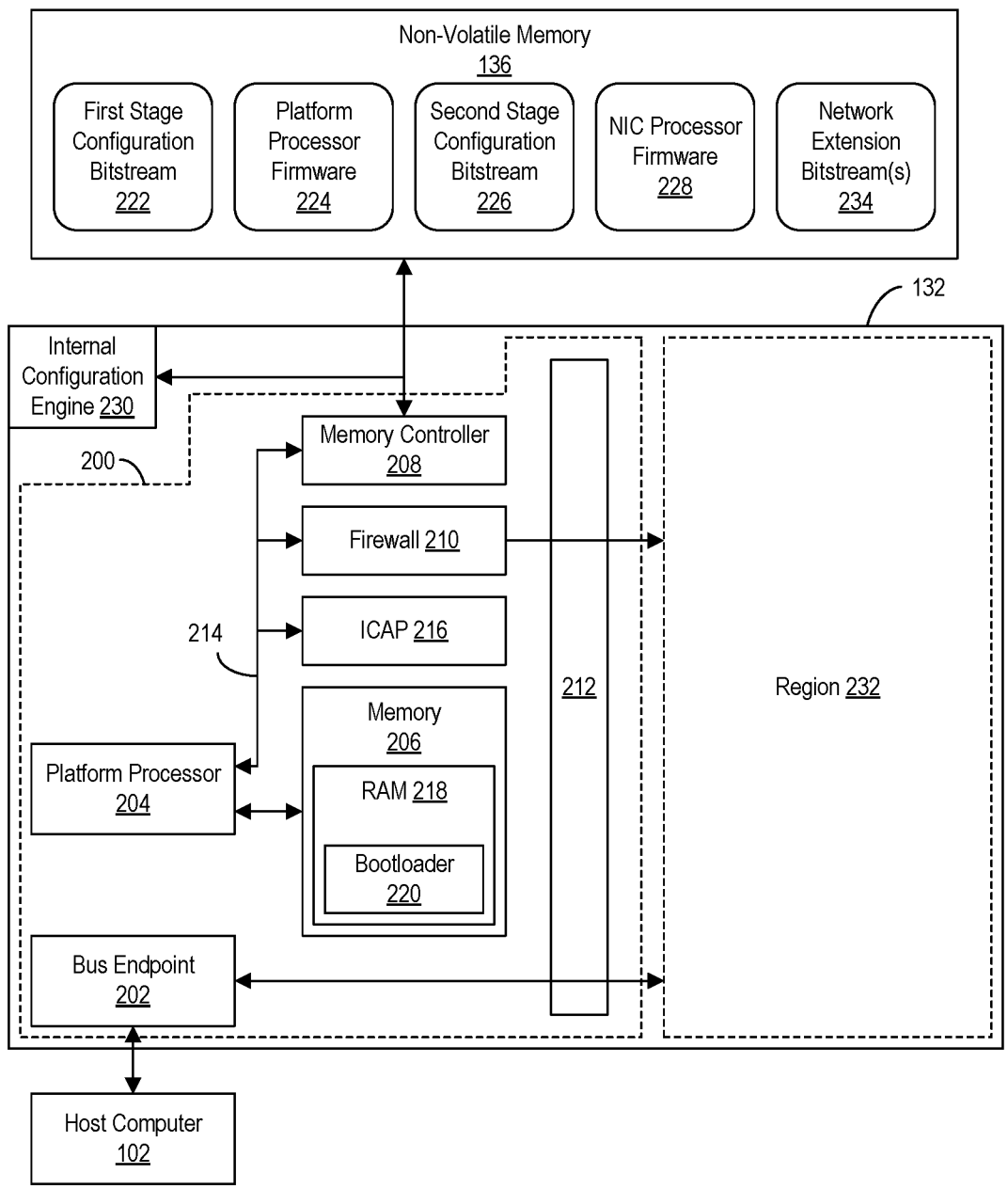
FIG. 2 illustrates an example circuit architecture implemented in a programmable integrated circuit (IC).

FIG. 2 illustrates an example circuit architecture 200 implemented in programmable IC 132. Architecture 200 is an example of first circuitry implemented within programmable IC 132 by loading a first stage configuration bitstream 222. In the example, architecture 200 includes a bus endpoint 202, a platform processor 204, a memory 206, a flash controller 208, and a firewall 210. Architecture 200 further includes isolation circuitry 212 and a communication bus 214. In the example of FIG. 2, bus endpoint 202, platform processor 204, memory 206, flash controller 208, firewall 210, isolation circuitry 212, and communication bus 214 are implemented in programmable logic.

Bus endpoint 202 is capable of establishing a communication link with host computer 102. For example, bus endpoint 202 may be implemented as a PCIe endpoint that establishes a PCIe connection with host computer 102. In order to establish the connection in under the required time for PCIe peripheral devices, bus endpoint 202, once implemented, may begin operating to establish the connection with host computer 102.

Platform processor 204 may be implemented as a soft processor capable of executing program code. Memory 206 includes RAM 218 and is connected to platform processor 204, e.g., via a memory interface. In one aspect, memory 206 stores program code, e.g., instructions, that are executable by platform processor 204. Memory 206 may be a dedicated instruction and/or data memory for platform processor 204.

Memory controller 208 is capable of interfacing with and accessing non-volatile memory 136. For example, memory controller 208 may be a flash memory controller. In the example, memory controller 208 is the data path through which platform processor firmware 224, second stage configuration bitstream 226, and NIC processor firmware 228 are loaded. Memory controller 208 may operate under control of platform processor 204 executing bootloader 220. In this regard, it should be appreciated that platform processor 204 and bootloader 220 are responsible for fetching platform processor firmware 224, second stage configuration bitstream 226, and NIC processor firmware 228.

Firewall 210 is capable of providing protection to platform processor 204 from any malfunctioning components that may be implemented in region 232 by loading second stage configuration bitstream 226. In one aspect, firewall 210 is capable of firewalling control signals. The control signals may be Advanced Microcontroller Bus Architecture (AMBA) eXtensible Interface (AXI) control signals, e.g., AXI-Lite control signals.

An AMBA AXI bus refers to an embedded microcontroller bus interface and communication protocol for use in establishing on-chip connections between circuit blocks and/or systems. AXI is used for purposes of illustration throughout this disclosure but is not intended as a limitation of the example implementations described. It should be appreciated that other communication buses, interconnects (e.g., cross-bars, switches, etc.), and/or communication protocols may be used in place of AXI.

In one aspect, firewall 210 is capable of detecting and preventing communication protocol violations. Protocol violations, for example, may "hang" platform processor 204. Firewall 210 is capable of ensuring that any circuitry implemented in region 232 does not hang platform processor 204 as a result of a communication protocol violation (e.g., an AXI protocol violation). In some cases, one or more portions of the circuitry implemented in region 232 may not be known to architecture 200. Firewall 210 provides a failsafe to ensure continued, proper operation of platform processor 204.

Isolation circuit 212 provides electrical isolation for any signals that cross between circuit blocks in architecture 200 and region 232. Isolation circuit 212 is capable of providing isolation while second stage configuration bitstream 226 is loaded into programmable IC 132 to implement circuitry in region 232. In one aspect, isolation circuit 212 may include one or more multiplexers that drive or maintain signals to or at a constant value to prevent the signals from toggling (e.g., changing state). In another aspect, isolation circuit 212 may register such signals and maintain the signals at a constant value to prevent the signals from toggling. Isolation circuit 212 may be disabled once second stage configuration bitstream 226 is loaded into programmable IC 132. For example, platform processor 204 may disable isolation circuit 212 in response to loading second stage configuration bitstream 226.

Communication bus 214 communicatively links platform processor 204, memory controller 208, firewall 210, and ICAP 216. In one aspect, communication bus 214 is an AXI interconnect. As noted, AXI is used for purposes of illustration in the case of communication bus 214 and throughout this disclosure. Other suitable buses and/or interconnects (e.g., cross-bars, etc.) may be used to implement communication bus 214.

In the example, an Internal Configuration Access Port (ICAP) 216 and an ICE 230 are shown. ICAP 216 and ICE 230 are implemented as hardwired circuit blocks within programmable IC 132. As such, neither ICAP 216 nor ICE 230 is implemented by loading first stage configuration bitstream 222. ICAP 216 is circuitry that is capable of loading received frames of configuration data (e.g., frames of a configuration bitstream) to program programmable IC 132. The frames may be received via communication bus 214 (e.g., an AXI bus). ICE 230 is capable of automatically loading an initial configuration bitstream (e.g., first stage configuration bitstream 222) from non-volatile memory 136 responsive to, e.g., immediately following, a startup condition such as power on and/or reset of programmable IC 132 (e.g., power on and/or reset of NIC 104).

In the example, ICE 230 may be configured to access a particular memory location in non-volatile memory 136 to access first stage configuration bitstream 222 or a pointer to first stage configuration bitstream 222. For example, ICE 230 may be connected to, e.g., hardwired to, the I/O pins of programmable IC 132 that connect to non-volatile memory 136. These may be the same I/O pins of programmable IC 132 subsequently coupled to memory controller 208 and used to couple memory controller 208, once instantiated, to non-volatile memory 136.

Upon startup, ICAP 216 and ICE 230, being hardwired circuit blocks, are implemented within programmable IC 132. Bus endpoint 202, platform processor 204, memory 206, memory controller 208, firewall 210, isolation circuit 212, and communication bus 214 are not yet implemented in programmable logic of programmable IC 132. Upon startup, ICE 230 automatically retrieves first stage configuration bitstream 222 from non-volatile memory 136. ICE 230 is capable of loading first stage configuration bitstream 222 within configuration memory of programmable IC 132. Loading first stage configuration bitstream 222 within configuration memory implements architecture 200 within programmable IC 132.

Accordingly, responsive to loading first stage configuration bitstream 222 within programmable IC 132, bus endpoint 202, platform processor 204, memory 206, memory controller 208, firewall 210, isolation circuit 212, and communication bus 214 are implemented in programmable logic. As noted, ICAP 216 already exists in programmable IC 132 prior to loading first stage configuration bitstream 222. First stage configuration bitstream 222, however, may establish connectivity between ICAP 216 and communication bus 214.

Responsive to architecture 200 being implemented in programmable IC 132, bus endpoint 202 may begin operating. Bus endpoint 202 may operate while (e.g., concurrently with) platform processor 204 executing bootloader 220. Bootloader 220 is included in first stage configuration bitstream 222. As such, upon instantiation of memory 206, bootloader 220 is stored in RAM 218.

Bootloader 220 is executable by platform processor 204. Once instantiated, platform processor 204 executes bootloader 220. In one aspect, bootloader 220 includes instructions (e.g., one or more drivers and/or instructions such as if-then-else instructions) that, when executed by platform processor 204, cause platform processor 204 to fetch or retrieve platform processor firmware 224 from non-volatile memory 136 using memory controller 208. Platform processor 204, in executing bootloader 220, stores platform processor firmware 224 within RAM 218.

Responsive to loading platform processor firmware 224, platform processor 204 begins executing platform processor firmware 224. Platform processor firmware 224, for example, may include a complete set of drivers and application programming interfaces for platform processor 204. In general, upon executing platform processor firmware 224, platform processor 204 takes over booting the rest of programmable IC 132. For example, platform processor firmware 224 includes instructions that, when executed by platform processor 204, cause platform processor 204 to load second stage configuration bitstream 226 using memory controller 208. Subsequently, responsive to a request from circuitry instantiated by second stage configuration bitstream 226 in region 232, platform processor 204 retrieves NIC processor firmware 228 from non-volatile memory 136 using memory controller 208. Platform processor firmware 224 may also include program code that, when executed by platform processor 204, causes platform processor 204 to validate configuration bitstreams and/or other firmware (e.g., program code for checking certificates) loaded into programmable IC 132.

Platform processor 204 uses ICAP 216 to load second stage configuration bitstream 226 into configuration memory of programmable IC 132. As noted, in one aspect, platform processor 204 may first validate second stage configuration bitstream 226 and only load second stage configuration bitstream 226 using ICAP 216 in response to successful validation thereof. Loading second stage configuration bitstream 226 into configuration memory implements another circuit architecture described herein in connection with FIG. 3 within region 232 of programmable IC 132.

With architecture 200 being implemented in programmable IC 132, bus endpoint 202 is capable of establishing a communication link with host computer 102. In order to establish a connection to host computer 102 in under the required time for PCIe peripheral devices, bus endpoint 202 may begin operating to establish the connection with host computer 102 responsive to implementation (e.g., responsive to loading first stage configuration bitstream 222). As such, bus endpoint 202 may begin operating and do so concurrently with platform processor 204 performing operations such as, for example, retrieving platform processor firmware 224 from non-volatile memory 136, storing platform processor firmware 224 in RAM 218, loading second stage configuration bitstream 226, and/or loading NIC processor firmware 228.

In one aspect, tandem boot is used whereby first stage configuration bitstream 222 is loaded into programmable IC 132 and begins to run (e.g., architecture 200 begins to operate) while second stage configuration bitstream 226 is loaded in tandem (e.g., concurrently with operation of architecture 200) and by platform processor 204. As such, bus endpoint 202 is capable of responding to traffic over the communication bus with host computer 102 while circuitry in region 232 is being implemented by another portion of architecture 200. Platform processor 204 is operative to bootstrap the remainder of the circuitry to be implemented in programmable IC 132.

FIG. 2 is illustrative of several features of first stage configuration bitstream 222. In one aspect, first stage configuration bitstream 222 is small in size (e.g., requires little memory and little time to load compared to loading the entire design represented by both the first and second stage configuration bitstreams. This allows programmable IC 132 to meet the PCIe boot time requirements. In another aspect, first stage configuration bitstream 222 may be implemented so that architecture 200 is simplified to reduce the likelihood of having to update architecture 200 in the future. Whenever first stage configuration bitstream 222 is updated in the field, the remainder of the system (e.g., second stage configuration bitstream and any other user circuit designs implemented in programmable IC 132 concurrently with architecture 200) also require recompilation. Recompilation may take significant time (e.g., on the order of days in some cases). In this regard, bootloader 220 may be implemented as a relatively simple or small program to reduce the likelihood of having to rebuild first stage configuration bitstream 222. As noted, platform processor firmware 224 (e.g., the primary firmware for platform processor 204) is not built into first stage configuration bitstream 222 as is bootloader 220, thereby allowing platform processor firmware 224 to be updated without requiring recompilation of first stage configuration bitstream 222. Platform processor 204 may also be used to authenticate any further configuration bitstreams and/or firmware for programmable IC 132 to ensure that programmable IC 132 boots in a secure manner.

Non-volatile memory 136 may also include one or more network extension bitstreams that, when loaded into programmable IC 132, implement one or more network extension circuit(s). In one aspect, each network extension bitstream is implemented as a partial configuration bitstream. As described in greater detail in connection with FIG. 3, platform processor 204 may load such partial configuration bitstreams from non-volatile memory 136 to configure particular sub-regions of region 232.

Figure 3:
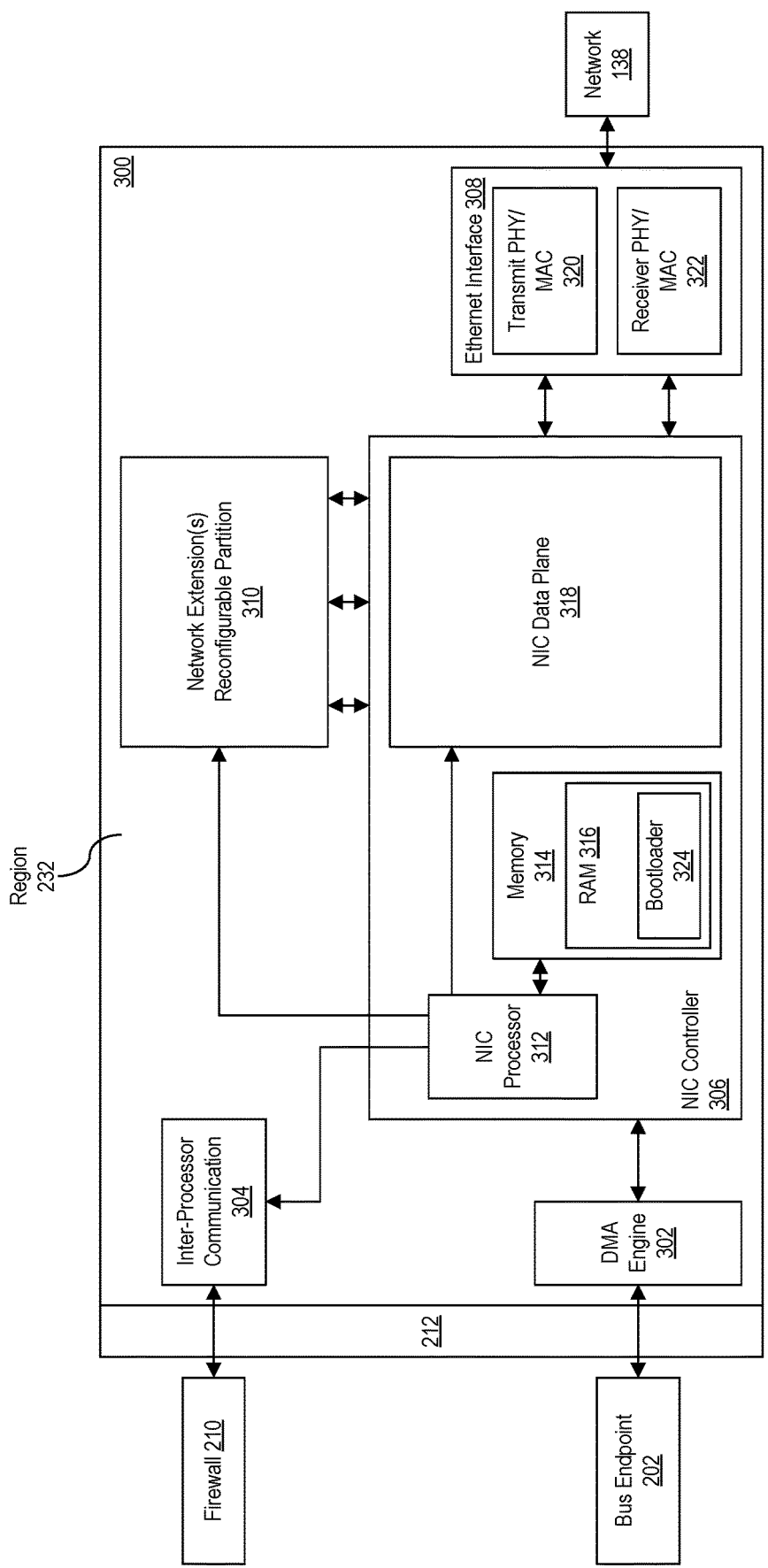
FIG. 3 illustrates another example circuit architecture implemented in a programmable IC.

FIG. 3 illustrates an example circuit architecture 300 implemented in region 232 of programmable IC 132. Architecture 300 is an example of second circuitry implemented within programmable IC 132 by loading second stage configuration bitstream 226. In the example, architecture 300 includes a direct memory access (DMA) engine 302, an inter-processor communication (IPC) circuit 304, a NIC controller 306, an Ethernet interface 308, and a network extensions reconfigurable partition (network extensions RP) 310.

DMA engine 302 provides the primary data transfer mechanism for exchanging data between host computer 102 and programmable IC 132. As illustrated, DMA engine 302 is coupled to bus endpoint 202 and to NIC controller 306. Ethernet interface 308 implements the physical (PHY) and Medium Access Control (MAC) layers for the network traffic. In the example, Ethernet interface 308 includes a transmit PHY/MAC 320 and a receive PHY/MAC 322 communicatively linking programmable IC 132 to network 138.

IPC circuit 304 may be implemented as a memory space that may be read and/or written by platform processor 204 and NIC processor 312. For example, IPC circuit 304 may include a mailbox that supports bi-directional communication between platform processor 204 and NIC processor 312. The mailbox may be implemented using first-in-first-out circuits supporting bi-directional messaging. IPC circuit 304 may also include a mutex that implements mutual exclusion locks allowing platform processor 204 and NIC processor 312 to lock shared resources preventing multiple accesses to such resources at the same time. Through IPC circuit 304, platform processor 204 is capable of configuring any processor implemented by second stage configuration bitstream 226.

NIC controller 306 is configured to perform control and data processing of network traffic sent to and/or received from Ethernet interface 308. NIC controller 306 includes a NIC processor 312, a memory 314 having a RAM 316, and a NIC data plane 318. In general, NIC processor 312 may be implemented as a soft processor capable of executing program code. Memory 314 may be implemented similar to memory 206 of FIG. 2. RAM 316 includes, or stores, a bootloader 324. Bootloader 324 is included in as part of second stage configuration bitstream 226 and, as such, is stored in RAM 316 when instantiated in programmable logic of programmable IC 132. Bootloader 324 is executable by NIC processor 312.

NIC data plane 318 is capable of operating on network traffic sent to and/or received from network 138. NIC data plane 318 may include one or more communication interfaces linking NIC data plane 318 with network extensions RP 310. Network extensions RP 310 may be implemented as a reconfigurable partition. One or more partial configuration bitstreams may be loaded into programmable IC 132 to implement user specified circuitry. These partial configuration bitstreams may be stored in non-volatile memory 136 and may be implemented at boot time of programmable IC 132 by platform processor 204 and/or at runtime.

For example, network extensions RP 310 may implement user specified circuitry (e.g., kernels referred to herein as network extension circuits or plug-in circuits) to augment and/or supplement processing performed by NIC data plane 318 on network traffic in reference to data flowing to network 138 or data received from network 138. Network extensions RP 310 and any user specified circuits implemented therein may be coupled to NIC data plane 318 via the one or more communication interfaces. The user specified circuitry may perform functions such as, for example, adding custom generic routing encapsulation (GRE) headers to data and/or implement a custom parser. With a custom parser, for example, metadata may be passed along and associated with the new parser data. The availability of one or more communication interfaces connecting network extensions RP 310 with NIC data plane 318 allows network traffic to be routed between (e.g., back and forth) network extensions RP 310 and NIC data plane 318 to customize the processing that is performed.

NIC data plane 318 enables programmatic access to make network administration more flexible. For example, to the extent that NIC controller 306 utilizes a large flow table that is searched over the look-up interface, customized flow tables may be implemented as user-specified circuitry in network extensions RP 310. NIC data plane 318 alleviates the processing burden that would otherwise be placed on host computer 102 to execute operations performed by NIC data plane 318 and/or user specified circuitry in network extensions RP 310.

Architecture 300 is implemented within region 232 by platform processor 204 executing platform processor firmware 224. For example, while bus endpoint 202 establishes a communication link and/or is active responding to traffic on the communication bus with host computer 102, platform processor 204 loads second stage configuration bitstream 226 within programmable IC 132 thereby implementing architecture 300.

Architecture 300, being implemented by second stage configuration bitstream 226 is reconfigurable and can be upgraded in the field without bringing down bus endpoint 202 of architecture 200 thereby disconnecting the communication link to host computer 102. This feature allows programmable IC 132 to remain active from the viewpoint of host computer 102 without severing the PCIe connection.

In addition, network extensions RP 310 is reconfigurable. Network extensions RP 310 may be reconfigured to implement different user specified circuitry to extend functionality of NIC controller 306 while the remainder of architecture 300 continues to operate uninterrupted. This means that functionality of NIC data plane 318 may be extended beyond what is included in NIC data plane 318 and continually updated over time with different user specified circuitry in network extensions RP 310 without disrupting network traffic to and/or from network 138, thereby allowing programmable IC 132 to meet the often strict uptime requirements in datacenters. Network extensions RP 310 may be configured by loading one or more network extension bitstream(s) 234 illustrated in FIG. 2.

In another aspect, NIC data plane 318 and/or network extensions RP 310 may be configured at boot time with particular boot time network extension circuit(s) and later be reconfigured with different run-time network extension circuit(s), for example, once the operating system of the host computer has been loaded.

In the example of FIG. 3, memory 314 is implemented to include bootloader 324 in RAM 316. Responsive to implementation of architecture 300, NIC processor 312 is capable of executing bootloader 324. In one aspect, bootloader 324 includes instructions (e.g., one or more drivers and/or instructions such as if-then-else instructions) that, when executed by NIC processor 312, cause NIC processor 312 to send a request to platform processor 204 via IPC 304 for retrieval of NIC processor firmware 228 from non-volatile memory 136. In response to the request, platform processor 204 retrieves NIC processor firmware 228 from non-volatile memory 136 using memory controller 208. Platform processor 204 sends NIC processor firmware 228 to NIC processor 312, which in turn stores NIC processor firmware 228 in RAM 316.

Having loaded NIC processor firmware 228, NIC processor 312 begins executing NIC processor firmware 228. NIC processor firmware 228, for example, may include a complete set of drivers and application programming interfaces executable by NIC processor 312 for configuring and managing NIC data plane 318, network extensions RP 310, DMA engine 302, and/or Ethernet interface 308. For example, NIC processor firmware 228 may include instructions that, when executed by NIC processor 312, cause NIC processor 312 to configure NIC data plane 318 (e.g., load tables, memories, activate one or more or certain ones of the communication interfaces and/or disable certain ones of the communication interfaces to network extensions RP 310). NIC processor 312 further may issue requests, to platform processor 204, to load partial configuration bitstreams to implement user specified circuitry within network extensions RP 310. NIC processor 312 is capable of obtaining any required configuration data by issuing one or more requests to platform processor 204 as described in connection with retrieval of NIC processor firmware 228. NIC processor 312 may configure any user circuitry implemented in network extension(s) RP 310 via circuitry, e.g., a control signal interface, coupling the two.

FIG. 3 is illustrative of several features of second stage configuration bitstream 226. In one aspect, bootloader 324 may be implemented as a relatively simple or small program to reduce the likelihood of having to rebuild second stage configuration bitstream 226. As noted, NIC processor firmware 228 (e.g., the primary firmware for NIC processor 312) is not built into second stage configuration bitstream 226 as is bootloader 324, thereby allowing NIC processor firmware 312 to be updated without requiring recompilation of second stage configuration bitstream 226. Further, as described, platform processor 204 may be used to authenticate any configuration bitstreams and/or firmware for programmable IC 132 to ensure that programmable IC 132 boots in a secure manner.

FIG. 4 illustrates an example method 400 of bootstrapping a programmable IC based NIC. Method 400 may be used to boot a NIC having a programmable IC as described in connection with FIGS. 1-3.

In block 402, first circuitry is implemented within the programmable IC by loading a first stage configuration bitstream. The first circuitry (e.g., as illustrated in FIG. 2) includes a bus endpoint configured to communicate with a host computer via a communication bus, a platform processor, and a first bootloader. In one aspect, the ICE loads the first stage configuration bitstream.

In block 404, the platform processor, in executing the first bootloader, loads platform processor (e.g., first) firmware within the programmable IC. In one aspect, while the platform processor operates to perform the various tasks described herein, the bus endpoint of the first circuitry is operative to establish a communication link with the host computer and may continue to process and/or respond to data from the host computer received over the communication link.

In block 406, second circuitry is implemented within the programmable IC by the platform processor, executing the platform processor firmware, loading a second stage configuration bitstream. The second circuitry (e.g., as illustrated in FIG. 3) includes a NIC controller. It should be appreciated that both architecture 200 of FIG. 2 and architecture 300 of FIG. 3 are implemented in the programmable IC concurrently subsequent to the bootstrapping processes described herein (e.g., after block 406). In block 408, the platform processor, in executing the platform processor firmware, loads second firmware within the programmable IC. The second firmware is executable to configure the second circuitry. For example, the NIC processor is capable of configuring and managing (e.g., writing configuration data to control registers) NIC data plane 318, DMA engine 302, and/or Ethernet interface 308.

In block 410, the NIC processor, in executing the second firmware, optionally requests the platform processor load a network extension(s) bitstream. The NIC processor, for example, is capable of issuing the request via the IPC. In response, the platform processor is capable of retrieving the network extension(s) bitstream from non-volatile memory or another source and implementing the network extension circuits in the network extension RP by loading the network extension(s) bitstream into configuration memory of programmable IC 132. In block 412, the NIC processor, in executing the second firmware, optionally configures the network extension circuit(s) once implemented in the network extensions RP. For example, the NIC processor is capable of configuring and managing (e.g., writing configuration data to control registers) of the network extension circuits implemented in the network extensions RP.

Figure 5:
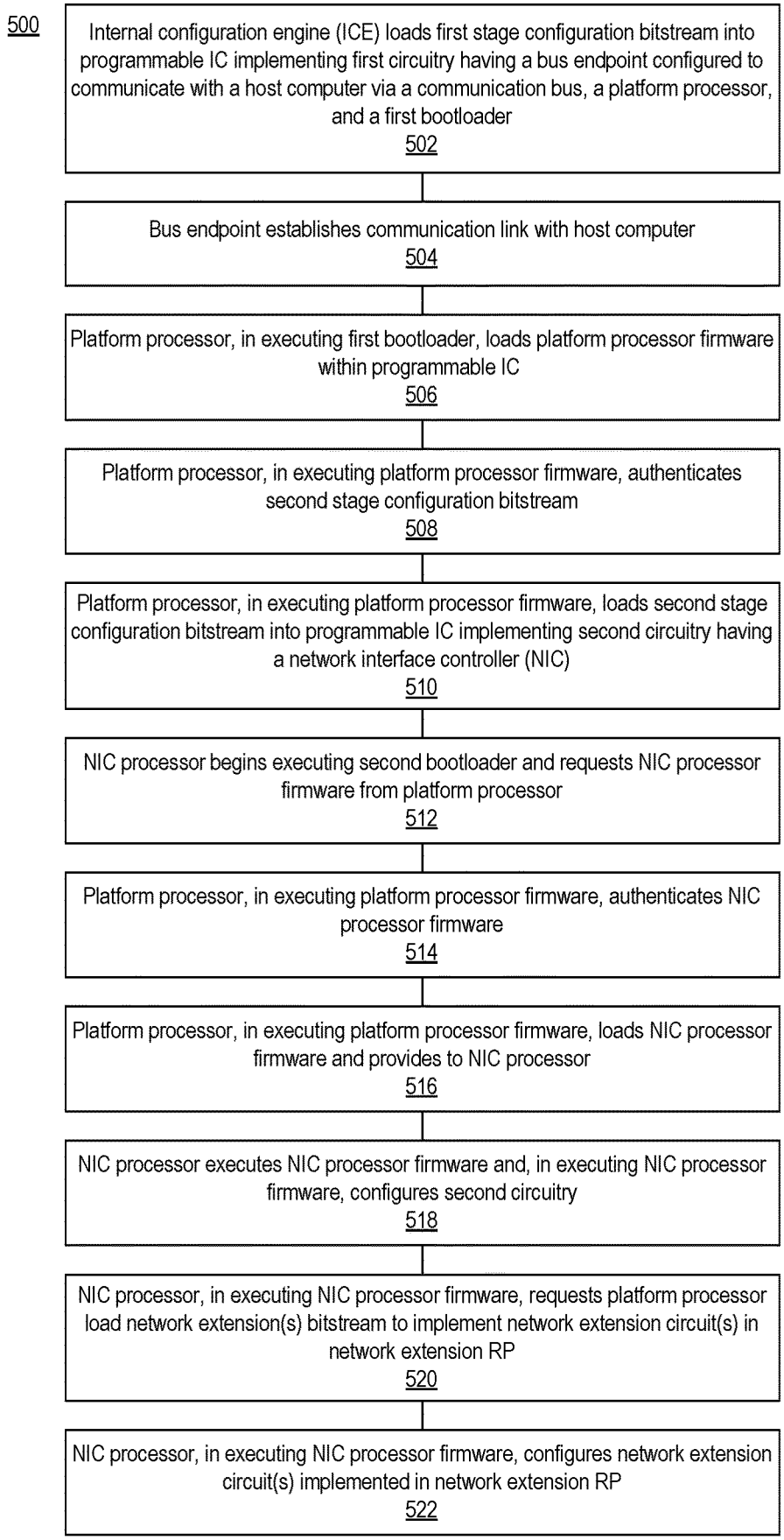
FIG. 5 illustrates another example method of bootstrapping a programmable IC based NIC.

FIG. 5 illustrates another example method 500 of bootstrapping a programmable IC based NIC. Method 500 may be used to boot a NIC having a programmable IC as described in connection with FIGS. 1-3.

In block 502, the ICE loads the first stage configuration bitstream into the programmable IC thereby implementing first circuitry (e.g., architecture 200 of FIG. 2) within the programmable IC. The first circuitry includes a bus endpoint configured to communicate with a host computer via a communication bus, a platform processor, and a first bootloader.

In block 504, in response to being implemented within the programmable IC, the bus endpoint establishes a communication link with the host computer. In block 506, the platform processor, in executing the first bootloader, loads the platform processor firmware within the programmable IC. It should be appreciated, that one or more blocks or all of the blocks following block 504 may be performed while the bus endpoint establishes and/or maintains the communication link with the host computer.

In block 508, the platform processor, in executing the platform processor firmware, optionally authenticates the second stage configuration bitstream. In block 510, the platform processor, in executing the platform processor firmware, loads the second stage configuration bitstream into the programmable IC. The second stage configuration bitstream implements second circuitry (e.g., architecture 300 of FIG. 3) having a NIC controller. In the case where the platform processor is capable of authenticating the second stage configuration bitstream, it should be appreciated that the platform processor only loads the second stage configuration bitstream into the programmable IC for configuration thereof in response to successful authentication of the second stage configuration bitstream.

In block 512, the NIC processor implemented as part of the NIC controller from the second stage configuration bitstream begins executing the second bootloader. Further, the NIC processor, in executing the second bootloader, requests the NIC processor firmware from the platform processor. The NIC processor is capable of issuing a request to the platform processor via the IPC.

In block 514, the platform processor, in executing the platform processor firmware, is capable of optionally authenticating the NIC processor firmware. In block 516, the platform processor, in executing the platform processor firmware, loads the NIC processor firmware and provides the NIC processor firmware to the NIC processor. Platform processor 514 may provide the NIC processor firmware to the NIC processor via the firewall and the IPC. The NIC processor, in executing bootloader 324, may store the NIC processor firmware in RAM 316. In the case where the platform processor authenticates the NIC processor firmware, it should be appreciated that the platform processor may only load the NIC processor firmware into the programmable IC (e.g., provide the NIC processor firmware to the NIC processor) in response to successful authentication.

In block 518, the NIC processor executes the NIC processor firmware. In executing the NIC processor firmware, the NIC processor is capable of configuring various elements of the second circuitry. NIC processor 312 is further capable of configuring other portions of architecture 300 including, for example, DMA engine 302, e.g., setting up queues with DMA engine 302, configuring Ethernet interface 308, and configuring NIC data plane 318.

In general, any configuration bitstreams (e.g., partial configuration bitstreams) loaded into programmable IC 132, whether for architectures 200, 300, or for user circuitry implemented in the network extensions RP may be accessed by the platform processor via the memory controller, authenticated by the platform processor, and used to configure the programmable IC using the ICAP. The loading of configuration bitstreams specifying user circuitry for implementation in network extensions RP may be performed as part of bootstrapping (e.g., following loading of the second stage configuration bitstream), at the request of the host computer (e.g., user application software executing therein), or at the request of the NIC processor.

For example, in block 520, the NIC processor, in executing the NIC processor firmware, optionally requests the platform processor load a network extension(s) bitstream. The NIC processor, for example, is capable of issuing the request via the IPC. In response, the platform processor is capable of retrieving the network extension(s) bitstream from non-volatile memory or another source and implementing the network extension circuits in the network extension RP by loading the network extension(s) bitstream into configuration memory of programmable IC 132.

In block 522, the NIC processor, in executing the NIC processor firmware, optionally configures the network extension circuit(s) once implemented in the network extensions RP. Once configuration bitstreams specifying user circuitry implemented in the network extensions RP have been loaded into programmable IC 132, NIC processor 312 is capable of performing any needed configuration of such circuitry. For example, the NIC processor is capable of configuring and managing (e.g., writing configuration data to control registers) of the network extension circuits implemented in the network extensions RP.

The examples described in connection with FIGS. 2-5 utilize a platform processor and a NIC processor. In one or more other examples, as illustrated in FIGS. 6-9, the NIC processor may be excluded by expanding the functionality of the platform processor.

Figure 6:
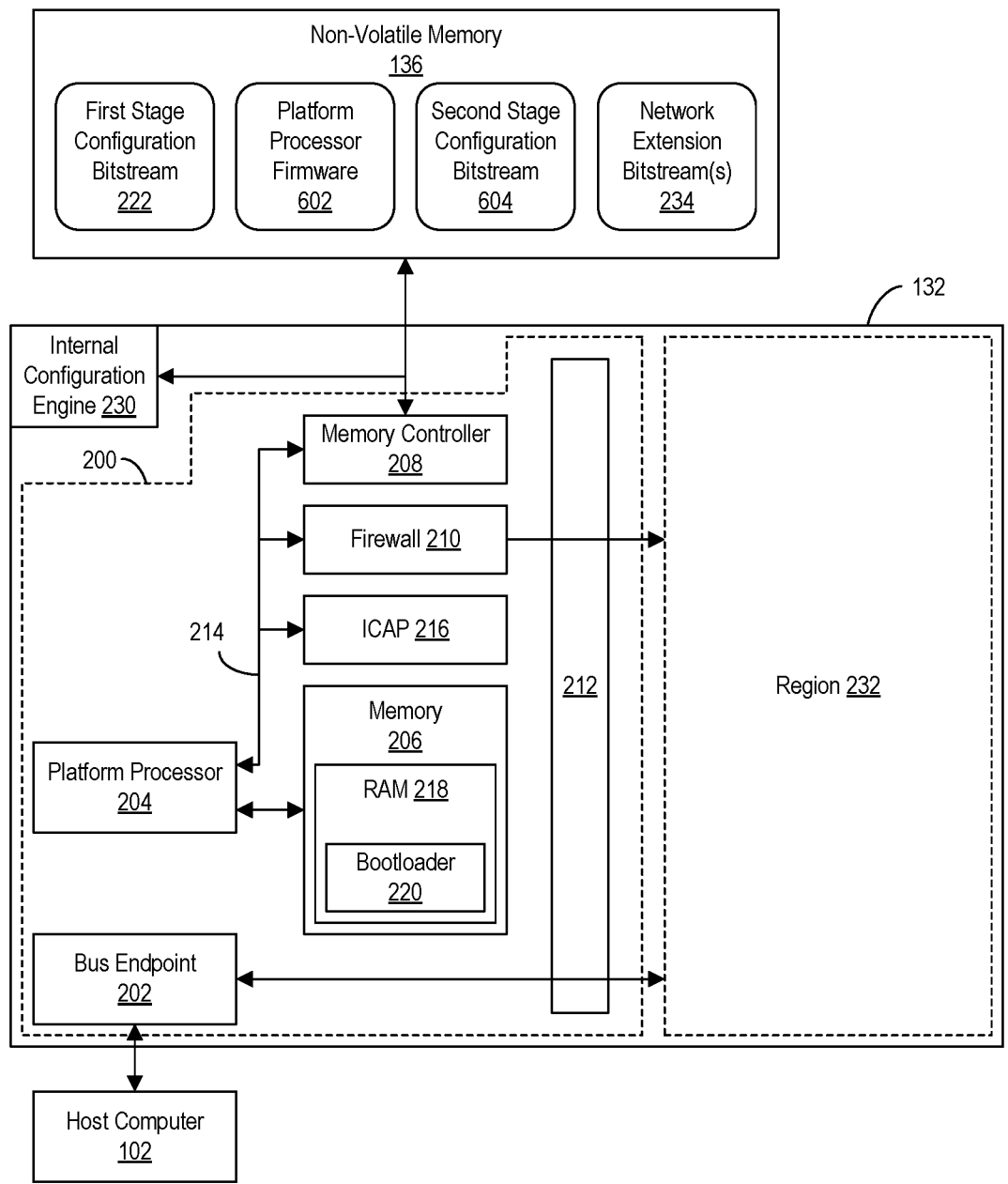
FIG. 6 illustrates another example circuit architecture implemented in a programmable IC.

Accordingly, FIG. 6 illustrates another example circuit architecture 600 implemented in programmable IC 132. Architecture 600 is substantially similar to architecture 200 of FIG. 2. In the example of FIG. 6, however, the functionality of platform processor 204 is expanded to include the functions and/or operations attributed to NIC processor 312 of FIG. 3. As shown, platform processor firmware 224 is replaced with platform processor firmware 602. Platform processor firmware 602, when executed by platform processor 204, is capable of performing the operations previously described with respect to platform processor firmware 224 and also the operations attributed to the NIC processor firmware 228. In effect, platform processor firmware 602 may be implemented as a combination of platform processor firmware 224 and NIC processor firmware 228.

With platform processor 204 functionality expanded, the second stage configuration bitstream 226 may be replaced with second stage configuration bitstream 604. Second stage configuration bitstream 604, when loaded into programmable IC 132, implements the example circuit architecture described in connection with FIG. 7.

Figure 7:
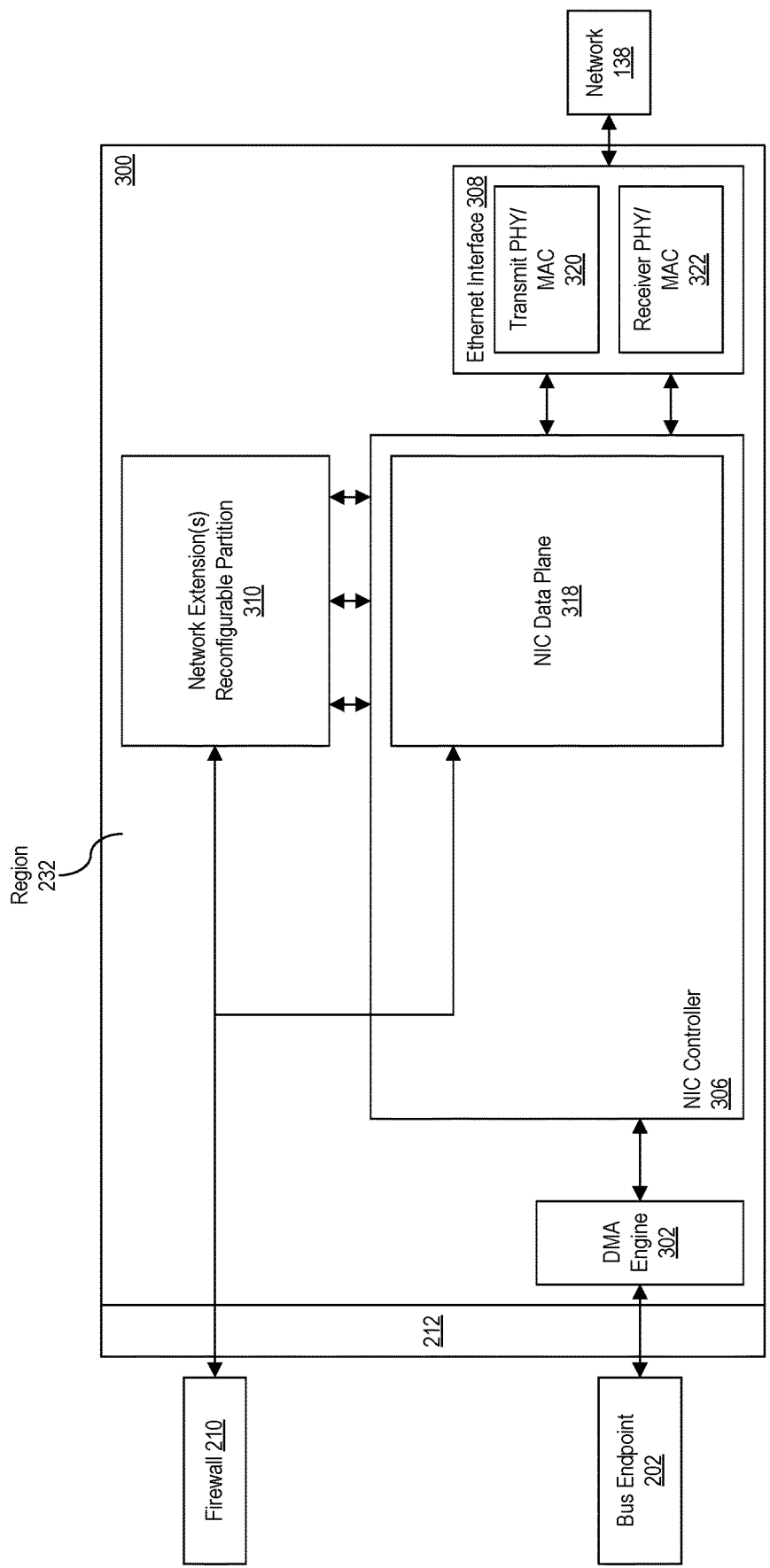
FIG. 7 illustrates another example circuit architecture implemented in a programmable IC.

FIG. 7 illustrates an example circuit architecture 700 implemented in region 232 of programmable IC 132. Architecture 700 illustrated in FIG. 7 is implemented by loading second stage configuration bitstream 604. Architecture 700 is substantially similar to architecture 300 of FIG. 3. In the example of FIG. 7, however, NIC processor 312 is omitted. With NIC processor 312 omitted, certain other components such as memory 314 and IPC 304 are also omitted as these circuit structures are no longer needed to support operation of NIC processor 312. Further, only one bootloader for the platform processor is needed.

In the example of FIG. 7, platform processor 204 is capable of loading network extension bitstream(s) to implement user circuitry in network extension(s) RP 310. Further, platform processor 204 is capable of configuring any user specified circuitry implemented in network extension(s) RP 310 by way of the connection, e.g., a control signal interface, from firewall 210 to network extension(s) RP 310.

Figure 8:
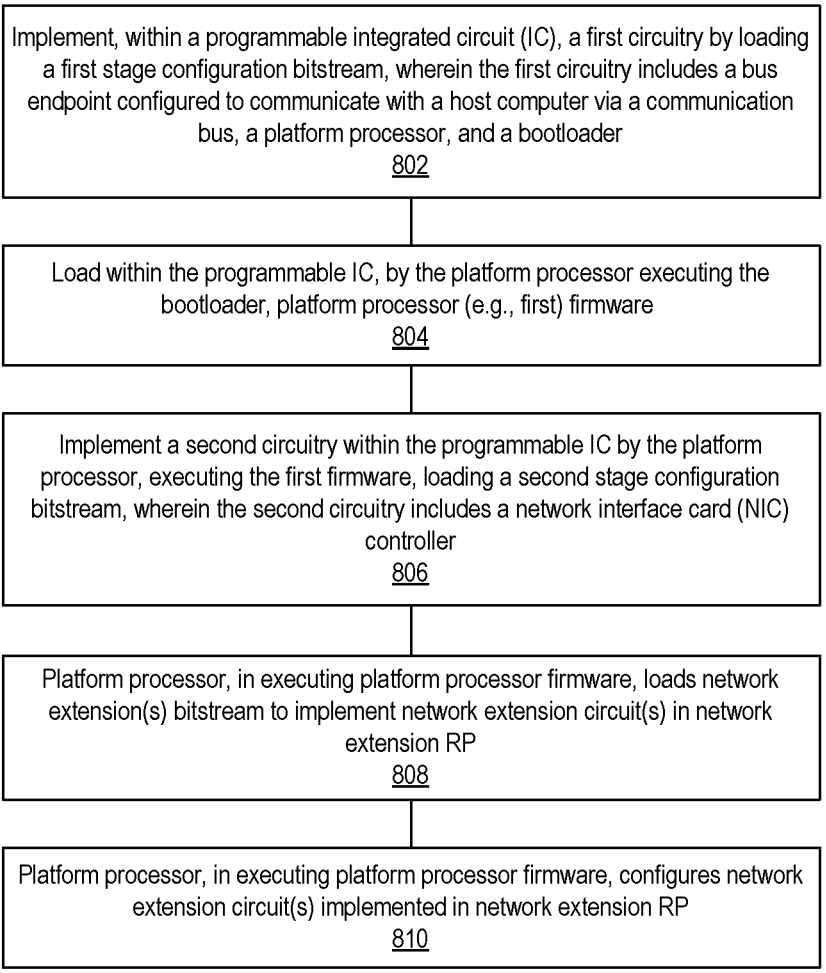
FIG. 8 illustrates another example method of bootstrapping a programmable IC based NIC.

FIG. 8 illustrates another example method 800 of bootstrapping a programmable IC based NIC. Method 800 may be used to boot a NIC having a programmable IC as described in connection with FIGS. 1, 6, and 7.

In block 802, first circuitry is implemented within the programmable IC by loading a first stage configuration bitstream. The first circuitry (e.g., architecture 600 of FIG. 6) includes a bus endpoint configured to communicate with a host computer via a communication bus, a platform processor, and a first bootloader. In one aspect, the ICE loads the first stage configuration bitstream.

In block 804, the platform processor, in executing the bootloader, loads platform processor (e.g., first) firmware within the programmable IC. In the example of FIG. 8, the platform processor firmware is the platform processor firmware 602 as described in connection with FIG. 6. In one aspect, while the platform processor operates to perform the various tasks described herein, the bus endpoint of the first circuitry is operative to establish a communication link with the host computer and may continue to process and/or respond to data from the host computer received over the communication link.

In block 806, second circuitry is implemented within the programmable IC by the platform processor, executing the platform processor firmware, loading a second stage configuration bitstream. The second stage configuration bitstream may be second stage configuration bitstream 604 as described in connection with FIGS. 6 and 7. The second circuitry (e.g., architecture 700 of FIG. 7) includes a NIC controller. It should be appreciated that both architecture 600 of FIG. 6 and architecture 700 of FIG. 7 are implemented in the programmable IC concurrently subsequent to the bootstrapping processes described herein (e.g., after block 806).

In block 808, platform processor, executing the platform firmware, optionally loads a network extension(s) bitstream. The platform processor is capable of retrieving the network extension(s) bitstream from non-volatile memory or another source and implementing the network extension circuits in the network extension RP by loading the network extension(s) bitstream into configuration memory of programmable IC 132. In block 810, the platform processor, in executing the platform firmware, optionally configures the network extension circuit(s) once implemented in the network extensions RP. For example, the platform processor is capable of configuring and managing (e.g., writing configuration data to control registers) of the network extension circuits implemented in the network extensions RP.

Figure 9:
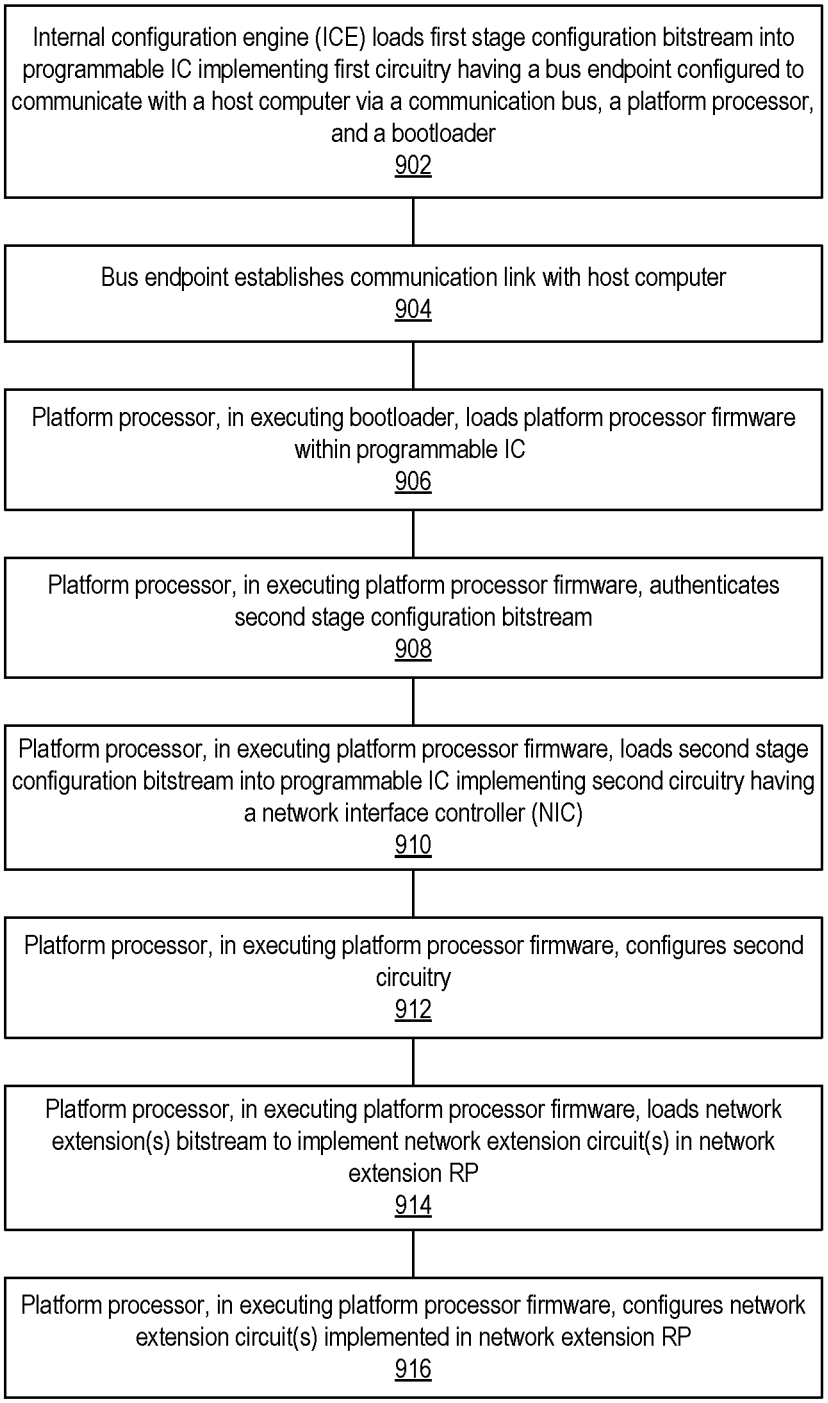
FIG. 9 illustrates another example method of bootstrapping a programmable IC based NIC.

FIG. 9 illustrates another example method 900 of bootstrapping a programmable IC based NIC. Method 900 may be used to boot a NIC having a programmable IC as described in connection with FIGS. 1 and 6-8.

In block 902, the ICE loads the first stage configuration bitstream into the programmable IC thereby implementing first circuitry (e.g., architecture 600 of FIG. 6) within the programmable IC. The first circuitry includes a bus endpoint configured to communicate with a host computer via a communication bus, a platform processor, and a first bootloader.

In block 904, in response to being implemented within the programmable IC, the bus endpoint establishes a communication link with the host computer. In block 906, the platform processor, in executing the bootloader, loads the platform processor firmware within the programmable IC. It should be appreciated, that one or more blocks or all of the blocks following block 904 may be performed while the bus endpoint establishes and/or maintains the communication link with the host computer.

In block 908, the platform processor, in executing the platform processor firmware, optionally authenticates the second stage configuration bitstream. In block 910, the platform processor, in executing the platform processor firmware, loads the second stage configuration bitstream into the programmable IC. The second stage configuration bitstream implements second circuitry (e.g., architecture 700 of FIG. 7) having a NIC controller. In the case where the platform processor is capable of authenticating the second stage configuration bitstream, it should be appreciated that the platform processor only loads the second stage configuration bitstream into the programmable IC for configuration thereof in response to successful authentication of the second stage configuration bitstream.

In block 912, the platform processor, in executing the platform processor firmware (e.g., platform processor firmware 602 with expanded functionality) is capable of configuring various elements of the second circuitry. For example, the platform processor is capable of configuring other portions of architecture 700 including, for example, DMA engine 302, e.g., setting up queues with DMA engine 302, configuring Ethernet interface 308, and configuring NIC data plane 318.

In general, any configuration bitstreams (e.g., partial configuration bitstreams) loaded into programmable IC 132, whether for architectures 300, 600, or for user circuitry implemented in the network extensions RP may be accessed by the platform processor via the memory controller, authenticated by the platform processor, and used to configure the programmable IC using the ICAP. The loading of configuration bitstreams specifying user circuitry for implementation in network extensions RP may be performed as part of bootstrapping (e.g., following loading of the second stage configuration bitstream), at the request of the host computer (e.g., user application software executing therein), or at the request of the NIC processor.

For example, in block 914, the platform processor, in executing the platform processor firmware, optionally loads a network extension(s) bitstream. The platform processor is capable of retrieving the network extension(s) bitstream from non-volatile memory or another source and implementing the network extension circuits in the network extension RP by loading the network extension(s) bitstream into configuration memory of programmable IC 132.

In block 916, the platform processor, in executing the platform processor firmware, optionally configures the network extension circuit(s) once implemented in the network extensions RP. Once configuration bitstreams specifying user circuitry implemented in the network extensions RP have been loaded into programmable IC 132, the platform processor is capable of performing any needed configuration of such circuitry. For example, the platform processor is capable of configuring and managing (e.g., writing configuration data to control registers) of the network extension circuits implemented in the network extensions RP.

Figure 10:
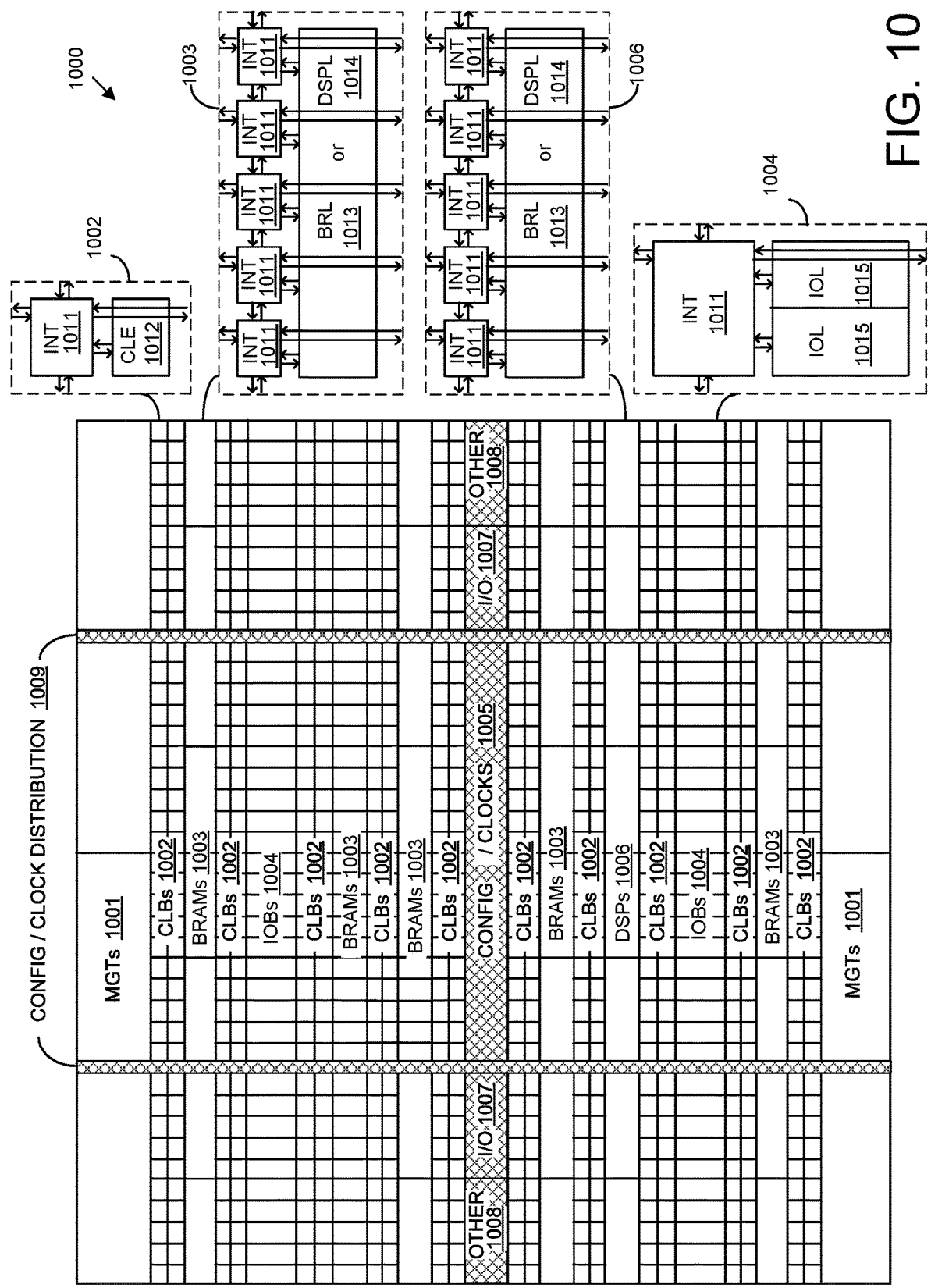
FIG. 10 illustrates an example architecture for an IC.

FIG. 10 illustrates an example architecture 1000 for a programmable IC. For example, architecture 1000 may be used to implement a field programmable gate array (FPGA) and/or programmable IC 132 of FIG. 1. As shown, architecture 1000 includes several different types of programmable circuit, e.g., logic, blocks. For example, architecture 1000 may include a large number of different programmable tiles including multi-gigabit transceivers (MGTs) 1001, configurable logic blocks (CLBs) 1002, random access memory blocks (BRAMs) 1003, input/output blocks (IOBs) 1004, configuration and clocking logic (CONFIG/CLOCKS) 1005, digital signal processing blocks (DSPs) 1006, specialized I/O blocks 1007 (e.g., configuration ports and clock ports), and other programmable logic 1008 such as digital clock managers, analog-to-digital converters, system monitoring logic, and so forth.

In some ICs, each programmable tile includes a programmable interconnect element (INT) 1011 having standardized connections to and from a corresponding INT 1011 in each adjacent tile. Therefore, INTs 1011, taken together, implement the programmable interconnect structure for the illustrated IC. Each INT 1011 also includes the connections to and from the programmable logic element within the same tile, as shown by the examples included at the right of FIG. 10.

For example, a CLB 1002 may include a configurable logic element (CLE) 1012 that may be programmed to implement user logic plus a single INT 1011. A BRAM 1003 may include a BRAM logic element (BRL) 1013 in addition to one or more INTs 1011. Typically, the number of INTs 1011 included in a tile depends on the height of the tile. As pictured, a BRAM tile has the same height as five CLBs, but other numbers (e.g., four) also may be used. A DSP tile 1006 may include a DSP logic element (DSPL) 1014 in addition to an appropriate number of INTs 1011. An 10B 1004 may include, for example, two instances of an I/O logic element (IOL) 1015 in addition to one instance of an INT 1011. The actual I/O pads connected to IOL 1015 may not be confined to the area of IOL 1015.

In the example pictured in FIG. 10, a horizontal area near the center of the die, e.g., formed of regions 1005, 1007, and 1008, may be used for configuration, clock, and other control logic. Vertical areas 1009 extending from this horizontal area may be used to distribute the clocks and configuration signals across the breadth of the programmable IC.

Some ICs utilizing the architecture illustrated in FIG. 10 include additional logic blocks that disrupt the regular columnar structure making up a large part of the IC. The additional logic blocks may be programmable blocks and/or dedicated (e.g., hardwired) circuitry.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, CLBs 1002 and BRAMs 1003 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream or partial configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

The configuration bitstream may specify the circuitry that is to be implemented within the programmable circuitry and any program code that is to be executed by a soft processor implemented therein. In some cases, architecture 1000 includes a dedicated configuration processor (e.g., ICE) that loads the configuration bitstream to the appropriate configuration memory and/or processor memory. The dedicated configuration processor does not execute user-specified program code and is not accessible by user designs.

FIG. 10 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 10 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks within the IC are for purposes of illustration only and are not intended as limitations.

In another aspect, a processor (not shown) may be implemented as dedicated circuitry, e.g., as a hardwired processor, that is fabricated as part of the die that implements the programmable circuitry of the IC. Such a processor may represent any of a variety of different processor types and/or systems ranging in complexity from an individual processor, e.g., a single core capable of executing program code, to an entire processor system having one or more cores, modules, co-processors, interfaces, or the like. Such a processor may be used as the platform processor in lieu of implementing a soft processor as described. In that case, the first stage configuration bitstream does not implement the processor, but rather configure the processor and establish connectivity with the other portions of the first circuitry described herein.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "soft" in reference to a circuit means that the circuit is implemented in programmable logic or programmable circuitry. Thus, a "soft processor" means at least one circuit implemented in programmable circuitry that is capable of carrying out instructions contained in program code.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one aspect, a method can include implementing, within a programmable IC, a first circuitry by loading a first stage configuration bitstream. The first circuitry includes a bus endpoint configured to communicate with a host computer via a communication bus, a platform processor, and a first bootloader. The platform processor, executing the first bootloader, loads a first firmware within the programmable IC. The method can include implementing second circuitry within the programmable IC by the platform processor, executing the first firmware, loading a second stage configuration bitstream. The second circuitry includes a network interface card (NIC) controller. The platform processor, executing the first firmware, loads a second firmware within the programmable IC. The second firmware is executable to configure the second circuitry.

The foregoing and other implementations can each optionally include one or more of the following features, alone or in combination. In particular, one implementation includes all the following features in combination.

In another aspect, the NIC controller includes a NIC processor that executes the second firmware to configure at least a portion of the second circuitry.

In another aspect, the second stage configuration bitstream includes a second bootloader that, when executed by the NIC processor, causes the NIC processor to request the platform processor load the second firmware.

In another aspect, the second circuitry includes an IPC circuit coupling the platform processor and the NIC processor.

In another aspect, the first circuitry includes a firewall circuit coupling the platform processor to the IPC circuit, wherein the firewall circuit is configured to prevent a protocol violation in a communication path from the platform processor to the NIC processor.

In another aspect, the second circuitry includes a DMA engine coupled to the bus endpoint and the NIC controller and an Ethernet interface coupled to the NIC controller.

In another aspect, the first circuitry includes a non-volatile memory controller for communicating with a non-volatile memory storing the first stage configuration bitstream, the first firmware, the second stage configuration bitstream, and the second firmware.

In another aspect, the loading the first stage configuration bitstream is performed using an ICE of the programmable IC. The first firmware, the second stage configuration bitstream, and the second firmware are loaded using the non-volatile memory controller.

In another aspect, the second circuitry includes a reconfigurable partition configured to implement one or more network extension circuits.

In another aspect, the bus endpoint initiates a communication link with a host computer via the communication bus while the loading of the first firmware is performed by the platform processor.

In another aspect, a programmable IC can include a first circuitry implemented by loading a first stage configuration bitstream. The first circuitry includes a bus endpoint configured to communicate with a host computer via a communication bus, a platform processor, and a first bootloader. The platform processor, in executing the first bootloader, loads, a first firmware. The programmable IC further can include a second circuitry implemented by loading a second stage configuration bitstream subsequent to the first stage configuration bitstream, wherein the second circuitry includes a NIC controller. The platform processor, in executing the first firmware, loads the second stage configuration bitstream and subsequently loads a second firmware that is executable to configure the second circuitry.

The foregoing and other implementations can each optionally include one or more of the following features, alone or in combination. In particular, one implementation includes all the following features in combination.

In another aspect, the NIC controller includes a NIC processor that executes the second firmware to configure at least a portion of the second circuitry.

In another aspect, the second stage configuration bitstream includes a second bootloader that, when executed by the NIC processor, causes the NIC processor to request that the platform processor load the second firmware.

In another aspect, the second circuitry includes an IPC circuit coupling the platform processor and the NIC processor.

In another aspect, the first circuitry includes a firewall circuit coupling the platform processor to the IPC circuit, wherein the firewall circuit is configured to prevent a protocol violation in a communication path from the platform processor to the NIC processor.

In another aspect, the second circuitry includes a DMA engine coupled to the bus endpoint and the NIC controller and an Ethernet interface coupled to the NIC controller.

In another aspect, the first circuitry includes a non-volatile memory controller for communicating with a non-volatile memory storing the first stage configuration bitstream, the first firmware, the second stage configuration bitstream, and the second firmware.

In another aspect, the loading of the first stage configuration bitstream is performed using an ICE of the programmable IC. The first firmware, the second stage configuration bitstream, and the second firmware are loaded using the non-volatile memory controller.

In another aspect, the second circuitry includes a reconfigurable partition configured to implement one or more network extension circuits.

In another aspect, the bus endpoint initiates a communication link with a host computer via the communication bus while the loading of the first firmware is performed by the platform processor.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    implementing, using programmable circuitry within a programmable integrated circuit (IC), a first circuitry by loading a first stage configuration bitstream into the programmable IC, wherein the first circuitry includes a bus endpoint configured to communicate with a host computer via a communication bus, a platform processor, and a first bootloader;
    loading within the programmable IC, by the platform processor executing the first bootloader, a first firmware;
    implementing a second circuitry using the programmable circuitry of the programmable IC by loading a second stage configuration bitstream into the programmable IC, wherein the second stage configuration bitstream is loaded into the programmable IC by the platform processor executing the first firmware, and wherein the second circuitry includes a network interface card (NIC) controller; and
    loading within the programmable IC, by the platform processor executing the first firmware, a second firmware executable to configure the second circuitry.

2. The method of claim 1, wherein the NIC controller includes a NIC processor that executes the second firmware to configure at least a portion of the second circuitry.

3. The method of claim 2, wherein the second stage configuration bitstream includes a second bootloader that, when executed by the NIC processor, causes the NIC processor to request the platform processor load the second firmware.

4. The method of claim 2, wherein the second circuitry includes an inter-processor communication circuit coupling the platform processor and the NIC processor.

5. The method of claim 4, wherein the first circuitry includes a firewall circuit coupling the platform processor to the inter-processor communication circuit, wherein the firewall circuit is configured to prevent a protocol violation in a communication path from the platform processor to the NIC processor.

6. The method of claim 1, wherein the second circuitry includes a direct memory access (DMA) engine coupled to the bus endpoint and the NIC controller and an Ethernet interface coupled to the NIC controller.

7. The method of claim 1, wherein the first circuitry includes a non-volatile memory controller for communicating with a non-volatile memory storing the first stage configuration bitstream, the first firmware, the second stage configuration bitstream, and the second firmware.

8. The method of claim 7, wherein:
    the loading the first stage configuration bitstream is performed using an internal configuration engine of the programmable IC; and
    the first firmware, the second stage configuration bitstream, and the second firmware are loaded using the non-volatile memory controller.

9. The method of claim 1, wherein the second circuitry includes a reconfigurable partition configured to implement one or more network extension circuits.

10. The method of claim 1, wherein the bus endpoint initiates a communication link with a host computer via the communication bus while the loading of the first firmware is performed by the platform processor.

11. A programmable integrated circuit, comprising:
    programmable circuitry;
    a first circuitry implemented using the programmable circuitry by loading a first stage configuration bitstream into the programmable integrated circuit, wherein the first circuitry includes a bus endpoint configured to communicate with a host computer via a communication bus, a platform processor, and a first bootloader;

wherein the platform processor, in executing the first bootloader, loads, a first firmware;

a second circuitry implemented using the programmable circuitry, wherein the second circuitry is implemented by loading a second stage configuration bitstream into the programmable integrated circuit subsequent to the first stage configuration bitstream, wherein the second circuitry includes a network interface card (NIC) controller; and wherein the platform processor, in executing the first firmware, loads the second stage configuration bitstream and subsequently loads a second firmware that is executable to configure the second circuitry.

12. The programmable integrated circuit of claim 11, wherein the NIC controller includes a NIC processor that executes the second firmware to configure at least a portion of the second circuitry.

13. The programmable integrated circuit of claim 12, wherein the second stage configuration bitstream includes a second bootloader that, when executed by the NIC processor, causes the NIC processor to request that the platform processor load the second firmware.

14. The programmable integrated circuit of claim 12, wherein the second circuitry includes an inter-processor communication circuit coupling the platform processor and the NIC processor.

15. The programmable integrated circuit of claim 14, wherein the first circuitry includes a firewall circuit coupling the platform processor to the inter-processor communication circuit, wherein the firewall circuit is configured to prevent a protocol violation in a communication path from the platform processor to the NIC processor.

16. The programmable integrated circuit of claim 11, wherein the second circuitry includes a direct memory access (DMA) engine coupled to the bus endpoint and the NIC controller and an Ethernet interface coupled to the NIC controller.

17. The programmable integrated circuit of claim 11, wherein the first circuitry includes a non-volatile memory controller for communicating with a non-volatile memory storing the first stage configuration bitstream, the first firmware, the second stage configuration bitstream, and the second firmware.

18. The programmable integrated circuit of claim 17, wherein:
the loading of the first stage configuration bitstream is performed using an internal configuration engine of the programmable IC; and
the first firmware, the second stage configuration bitstream, and the second firmware are loaded using the non-volatile memory controller.

19. The programmable integrated circuit of claim 11, wherein the second circuitry includes a reconfigurable partition configured to implement one or more network extension circuits.

20. The programmable integrated circuit of claim 11, wherein the bus endpoint initiates a communication link with a host computer via the communication bus while the loading of the first firmware is performed by the platform processor.

* * * * *